TUNER FOR TELEVISION RECEIVERS

Filed April 10, 1957 7 Sheets-Sheet 1

INVENTOR.
CLEON F. FREY
BY Ostrolenk, Faber, Gerb & Soffen
ATTORNEYS

Jan. 3, 1961 C. F. FREY 2,967,238

TUNER FOR TELEVISION RECEIVERS

Filed April 10, 1957 7 Sheets-Sheet 2

INVENTOR.
CLEON F. FREY
BY Adtrolenk Faber, Gerb & Soffen
ATTORNEYS

INVENTOR.
CLEON F. FREY
BY Ostrolenk, Faber, Gerb & Soffen
ATTORNEYS

Jan. 3, 1961 C. F. FREY 2,967,238

TUNER FOR TELEVISION RECEIVERS

Filed April 10, 1957 7 Sheets-Sheet 4

INVENTOR.
CLEON F. FREY

BY Ostrolenk, Faber, Gerb & Soffen

ATTORNEYS

Jan. 3, 1961 C. F. FREY 2,967,238
TUNER FOR TELEVISION RECEIVERS
Filed April 10, 1957 7 Sheets-Sheet 5
FIG. 17
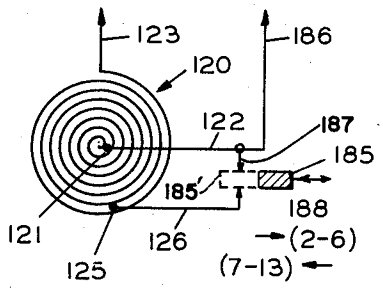
FIG. 18
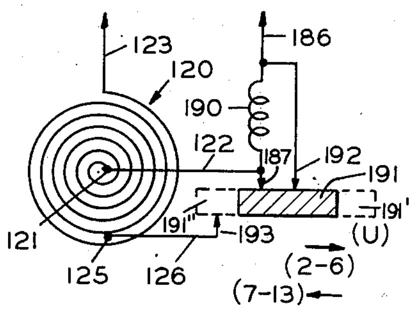
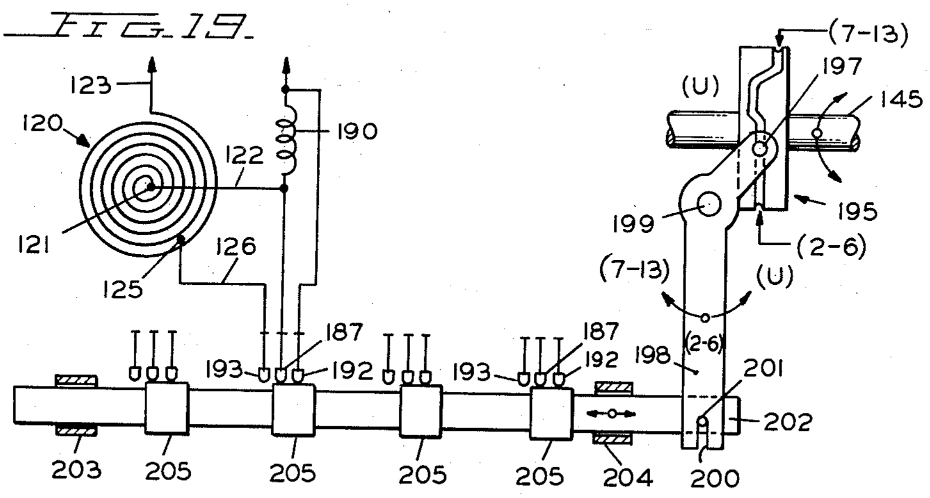
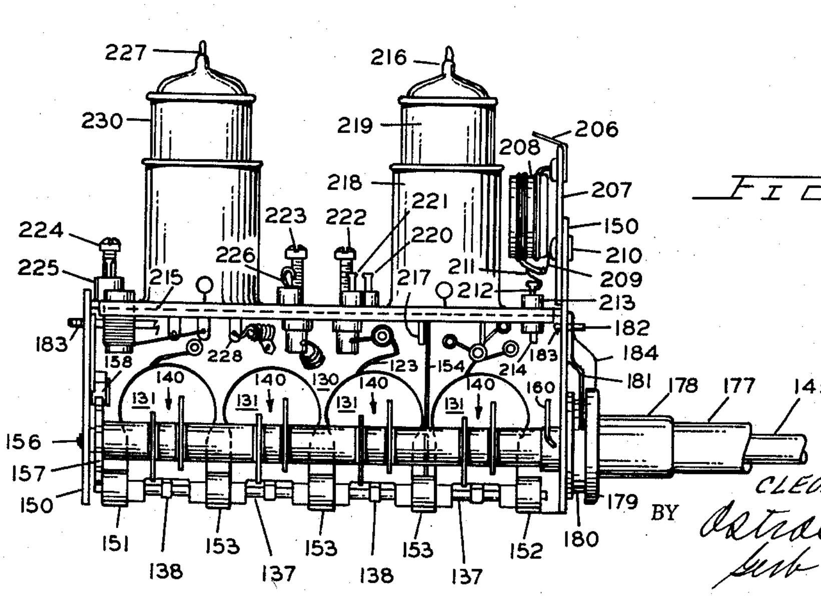
FIG. 20
INVENTOR.
CLEON F. FREY
BY Ostrolenk, Faber, Gerb & Soffen
ATTORNEYS INVENTOR.
CLEON F. FREY
BY Ostrolenk, Faber, Gerb & Soffen
ATTORNEYS Jan. 3, 1961 C. F. FREY 2,967,238

TUNER FOR TELEVISION RECEIVERS

Filed April 10, 1957 7 Sheets-Sheet 7

INVENTOR.
CLEON F. FREY

BY Ostrolenk, Faber, Gerb & Soffen

ATTORNEYS 2,967,238

TUNER FOR TELEVISION RECEIVERS

Cleon F. Frey, Pasadena, Calif., assignor to Standard Coil Products Co., Inc., Melrose Park, Ill., a corporation of Illinois Filed Apr. 10, 1957, Ser. No. 651,881

5 Claims. (Cl. 250—40)

This invention relates to tuners for television receivers, and more particularly relates to novel television tuners of simplified construction resulting in smaller size and weight, and less cost than conventional tuners.

The simplified tuner of the present invention is particularly directed to the reception of the twelve VHF television channels, with provision for converting the tuner for reception at a "thirteenth" position for the UHF channels. The twelve VHF channels comprise channels 2 to 6, covering 54 to 88 megacycles; and channels 7 to 13 covering the frequencies from 74 to 216 megacycles. The "thirteenth" position is arranged to convert the circuit to a straight intermediate frequency amplifier. Such conversion requires inductance tuning values somewhat larger than those for channel 2, in view of the lower frequency of the resultant IF.

Conventional turret-type tuner have four individual coils for each of the VHF channels, and accordingly comprise 12 sets of such coils. Wafer-type tuners have four coil sets with 12 individual taps for the individual VHF channel reception. In accordance with the present invention, one set of four coils is utilized for the 12 VHF channels. In a preferred form of the invention, a tap is provided intermediate of each of the four coils in its utilization for reception of the lower and higher frequency bands of the four coils in its utilization for reception of the lower and higher frequency bands of the VHF range, in a manner to be more fully set forth hereinafter.

An important feature of the present invention is the simultaneous variation of the inductance of the plurality of coils (e.g. four) for the tuner circuit, by use of metallic body variably positioned with respect to the coils through a common cam arrangement. In a particular embodiment copper discs are moved with respect to a fixed set of four coils to provide inductance variation on the coils for channels 2 to 6 in one mode, and for channels 7 to 13 in a second mode of operation. The cam arrangement motivates the copper discs in two individual cycles, through correspondingly shaped cam surfaces. The coil sets are tapped to employ a smaller portion of each coil for tuning of the upper band channels 7 to 13, as will be set forth in more detail hereinafter.

By employing, basically, one set of four coils with the inductance thereof varied in a simple and effective manner, the complexity and the number of components and circuit connections thereof is greatly reduced in the invention tuner. The advantages are: substantially smaller in size, practically half of the weight, and a significant reduction in cost compared to conventional tuners. The compact size and lighter weight makes the invention tuner particularly advantageous for use of portable television sets.

A tuner constructed in accordance with the present invention measured 1½ inches x 1¾ inches x 4 inches long. The gain and noise figures of the invention tuner compare favorably with conventional tuners, and oscillator radiation is readily held within FCC limitations. The compact tuner provided by the present invention permits its mounting at the top front of a television receiver, without requiring an extension or a flexible shaft, in view of its flatness and compactness of construction.

In carrying out the principles and features of the present invention, a metallic disc is arranged adjacent each flat or pancake-type of coil in the tunable circuits of the tuner. Such discs may be pivoted, and act as the cover of a book as to angular orientation change with respect to the coils. In another form of the invention, the metallic discs are motivated parallel with respect to flat coils. The respective metallic inductance changing means are moved in a coordinated manner with respect to a plurality of coils, and comprise the tuning means for the tuner. A small section of each coil is utilized for the higher frequency band, namely channels 7 to 13, to effect the wide inductance range necessary for subtending the tuning of channels 2 to 13.

The tuning shaft controls the cam means for varying the metallic inductance change elements, and also coordinates the coil switch over circuitry for the upper and lower bands of the VHF tuning range. For conversion of the tuner as an IF frequency amplified circuit for the VHF, an additional inductance is added to each of the basic coils, wherein the tuner is tuned to the desired IF frequency when motivated to its UHF tuning position, as will be described in more detail.

It is accordingly an object of the present invention to provide a simplified tuner construction with novel characteristics.

Another object of the present invention is to provide a novel television tuner having a set of coils for the tuning circuits, and means for varying the inductance of the respective coil in unison, to provide television channel selection. A further object of the present invention is to provide a novel television tuner embodying flat metallic discs arranged for channel selection of a tuner by coordinated change of the inductance values of the coils of the respective tuner circuits.

Still another object of the present invention is to provide a novel television tuner employing a set of coils for the tuning circuitry, and embodying means for varying the inductance of each of the coils in conjunction with a change of circuitry on the coils for establishing at least two bands of tuning in the VHF range.

Still a further object of the present invention is to provide a novel television tuner of small size and lower in cost than conventional tuners.

Another object of the present invention is to provide a novel television tuner comparable in performance to conventional tuners with equivalent circuit arrangements, but utilizing a minimum of coils and switching connections for establishing reception of the television channels in the VHF range.

A further object of the present invention is to provide a novel television tuner embodying a set of flat tuning coils, the inductance of which is varied by motivating a metallic disc with respect to each of the coils for adjusting the tuning of the coils in unison with a common tuning shaft.

These and further objects of the present invention will become more apparent in the following description of exemplary embodiments thereof, taken in connection with the drawings, in which.

Figure 8:
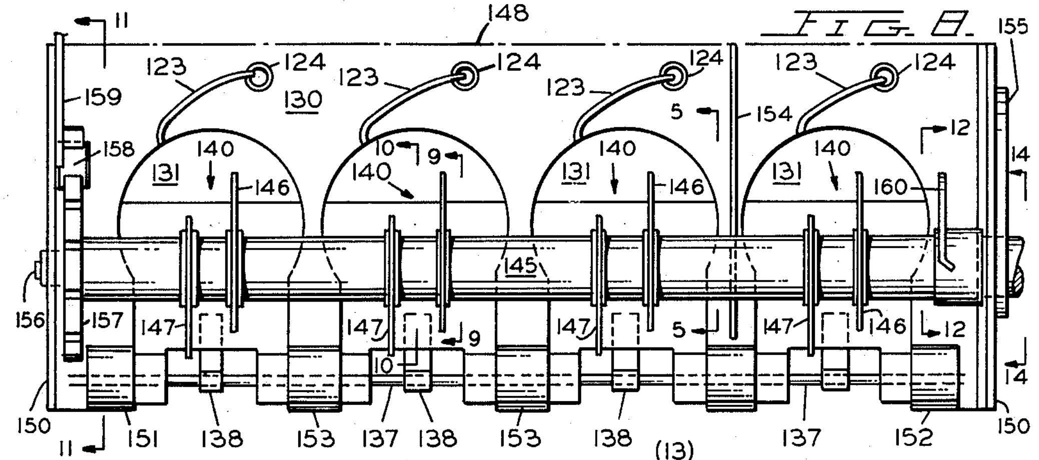
Fig. 8 is a side elevational view of the tuning arrangement of the exemplary tuner, corresponding to the view of Fig. 7, with the tuning cam shaft incorporated therewith.
Figure 9:
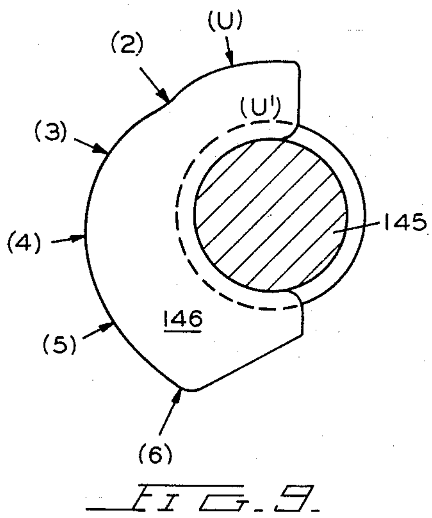
Figure 10:
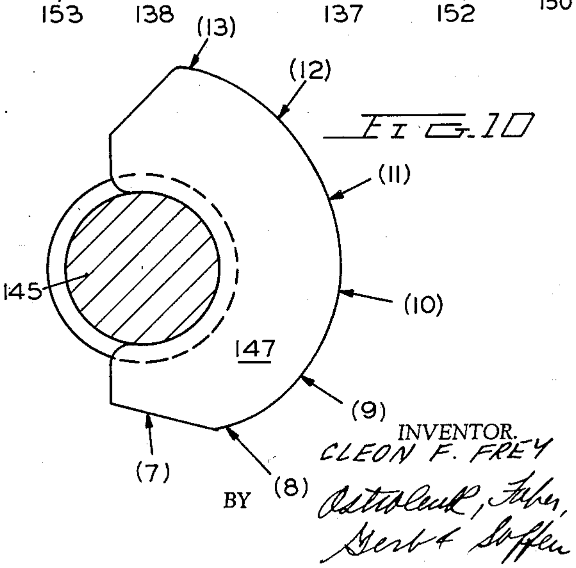

Figs. 9 and 10 are plan views of the individual tuning cams for the respective low and high bands in the VHF range, corresponding to the views taken along the lines 9—9 and 10—10 of Fig. 8.

Figure 11:
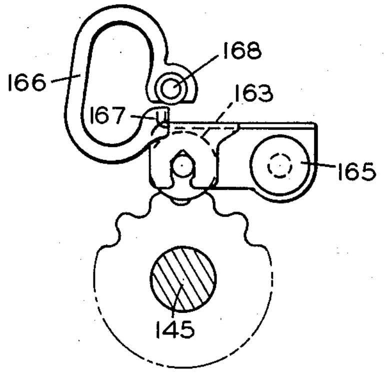

Fig. 11 is a plan view of the detent mechanism of the tuner, as seen along the line 11—11 of Fig. 8.

Figure 12:
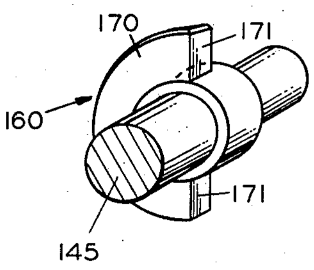

Fig. 12 is a perspective illustration of the band switching cam, corresponding to the view taken along the line 12—12 of Fig. 8.

Figure 13:
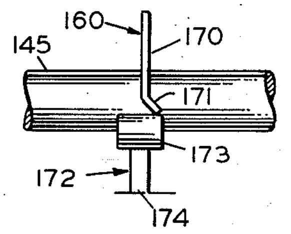

Fig. 13 illustrates the coaction of the switching cam of Fig. 12 with a portion of the switch-over mechanism.

Figure 14:
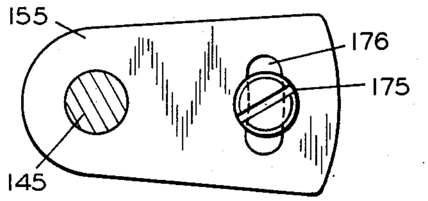

Fig. 14 is a plan view of the tuning shaft retainer, corresponding to the view taken along the line 14—14 of Fig. 8.

Figure 15:
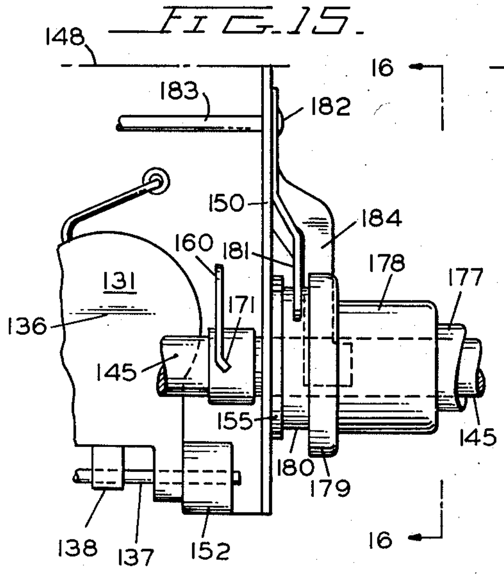

Fig. 15 is an end elevational view of the exemplary tuner, illustrating the fine tuning arrangement therefor.

Figure 16:
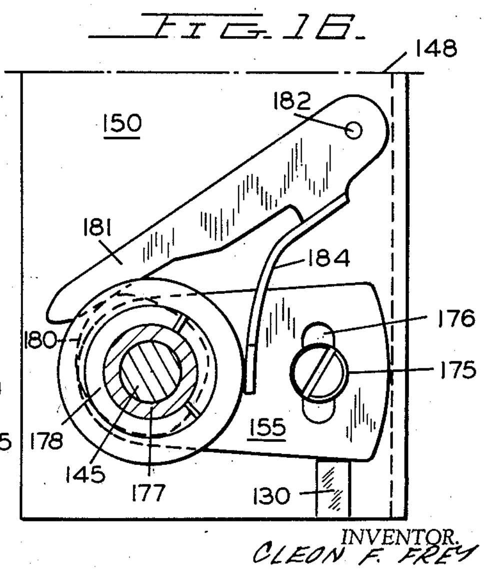

Fig. 16 is a side elevational view of the fine tuning arrangement, as seen along the line 16—16 in Fig. 15.

Fig. 17 is a schematic electrical illustration of a two-band switching arrangement for the coils of the exemplary tuner.

Fig. 18 is a schematic arrangement, corresponding to Fig. 17, of the coils for the exemplary tuner, incorporating additional circuit elements for providing a "thirteenth" or UHF reception position.

Fig. 19 is a diagrammatic representation of the switch over mechanism and circuits therewith for establishing three modes and two bands of operation of the exemplary tuner.

Fig. 20 is an end elevational view of the exemplary tuner, with the side cover removed, incorporating the tuner components illustrated in Figs. 2 to 16.

Figures 21, 22, 23:
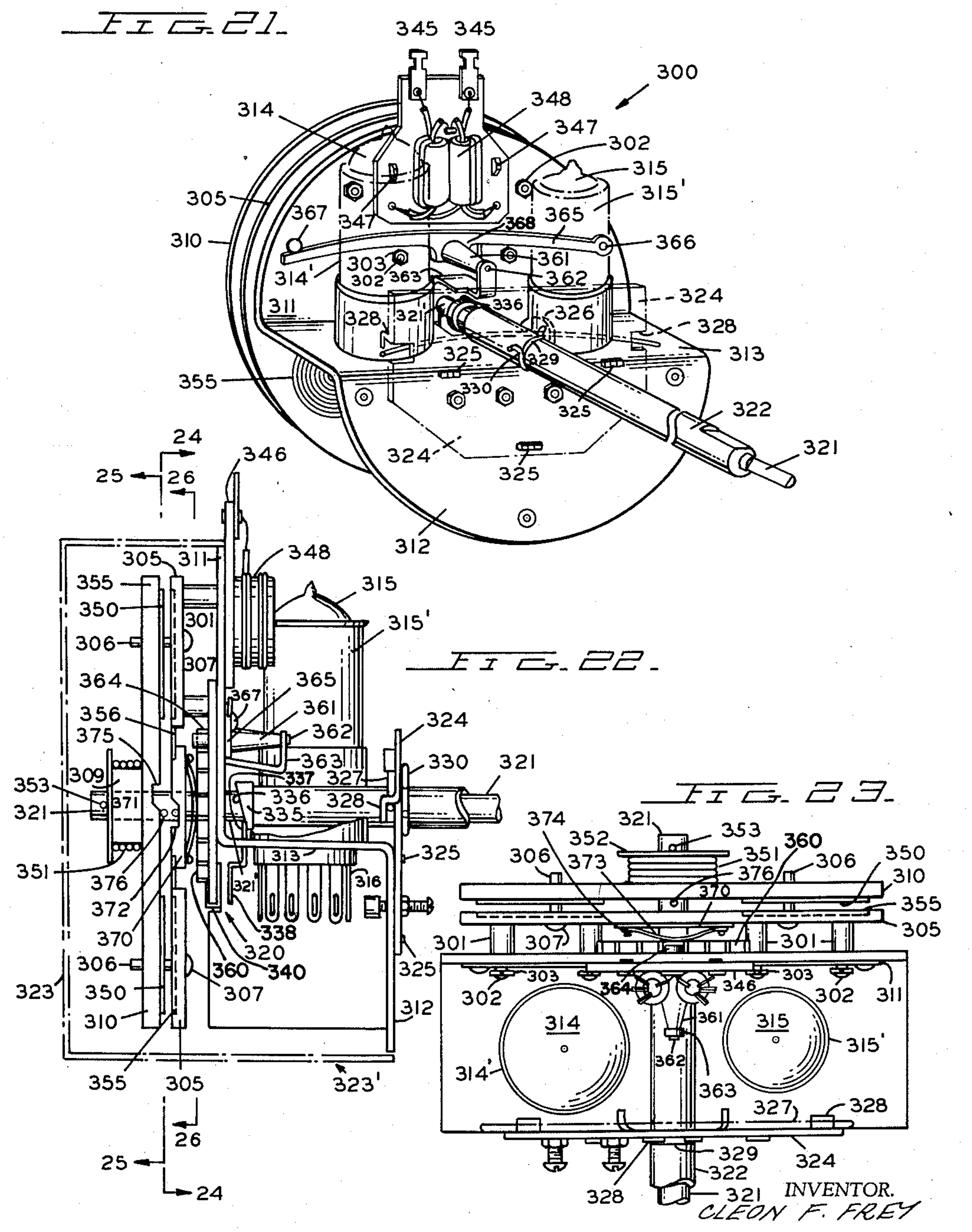

Figs. 21, 22 and 23 are respective perspective side and top views of a modified tuner arrangement in accordance with the invention.

Figure 24:
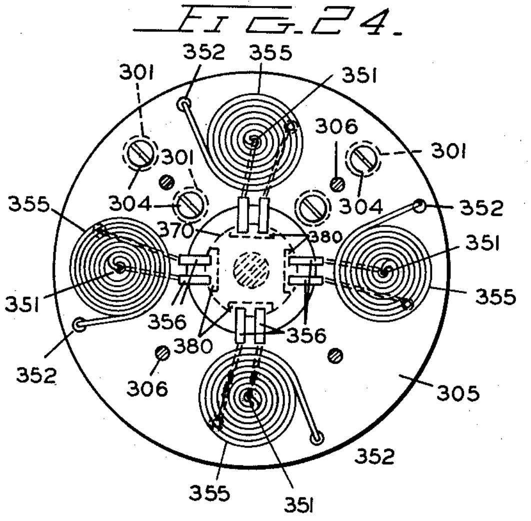

Fig. 24 is a face view of the coil board of the tuner of Figs. 21–23, taken along the line 24—24 of Fig. 21.

Figure 25:
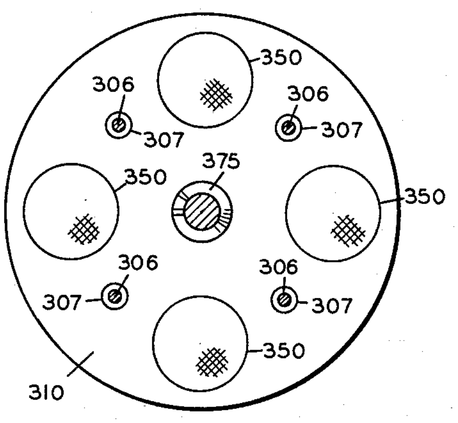

Fig. 25 is a face view of the metal disc board of the tuner of Figs. 21–23, taken along the line 25—25 of Fig. 21.

Figures 26, 27, 28:
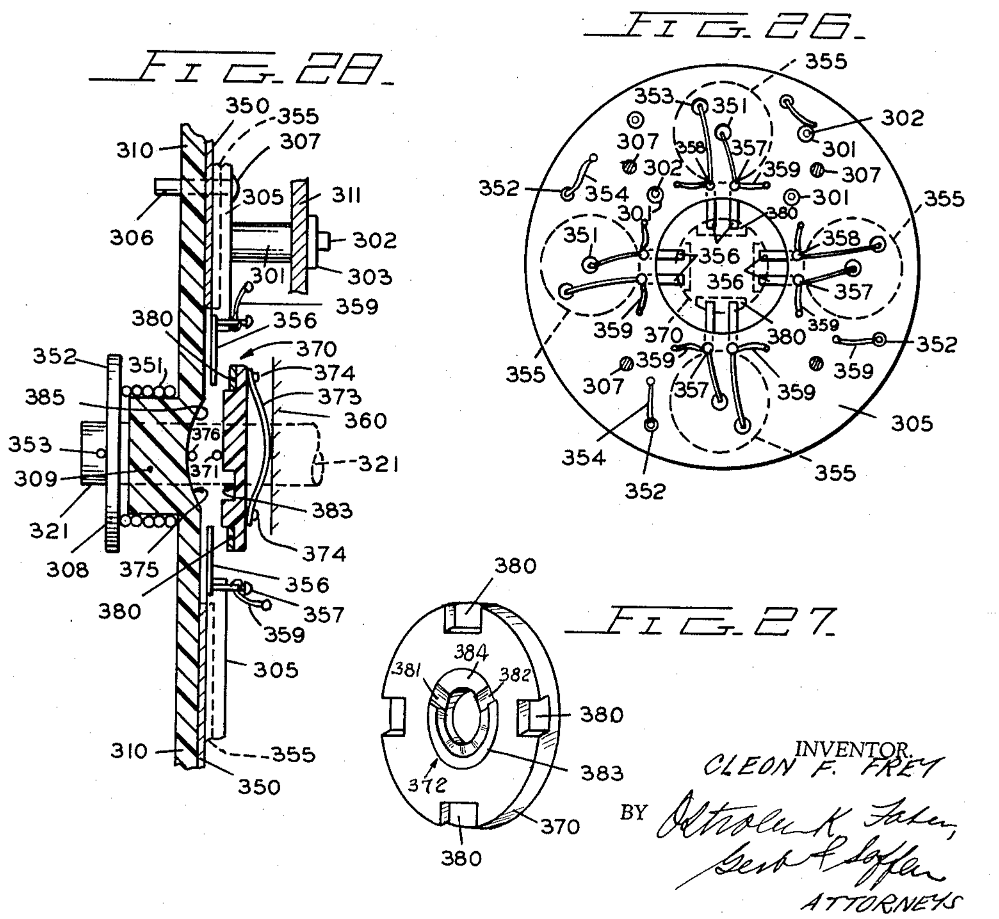

Fig. 26 is a rear view of the coil board of Fig. 24, as seen from the line 26—26 of Fig. 21.

Fig. 27 is a face view of the shorting member as taken along the line 27—27 of Fig. 21.

Fig. 28 is an enlarged view of the operator mechanism for channel changing of the tuner of Figs. 21–23.

Figure 1:
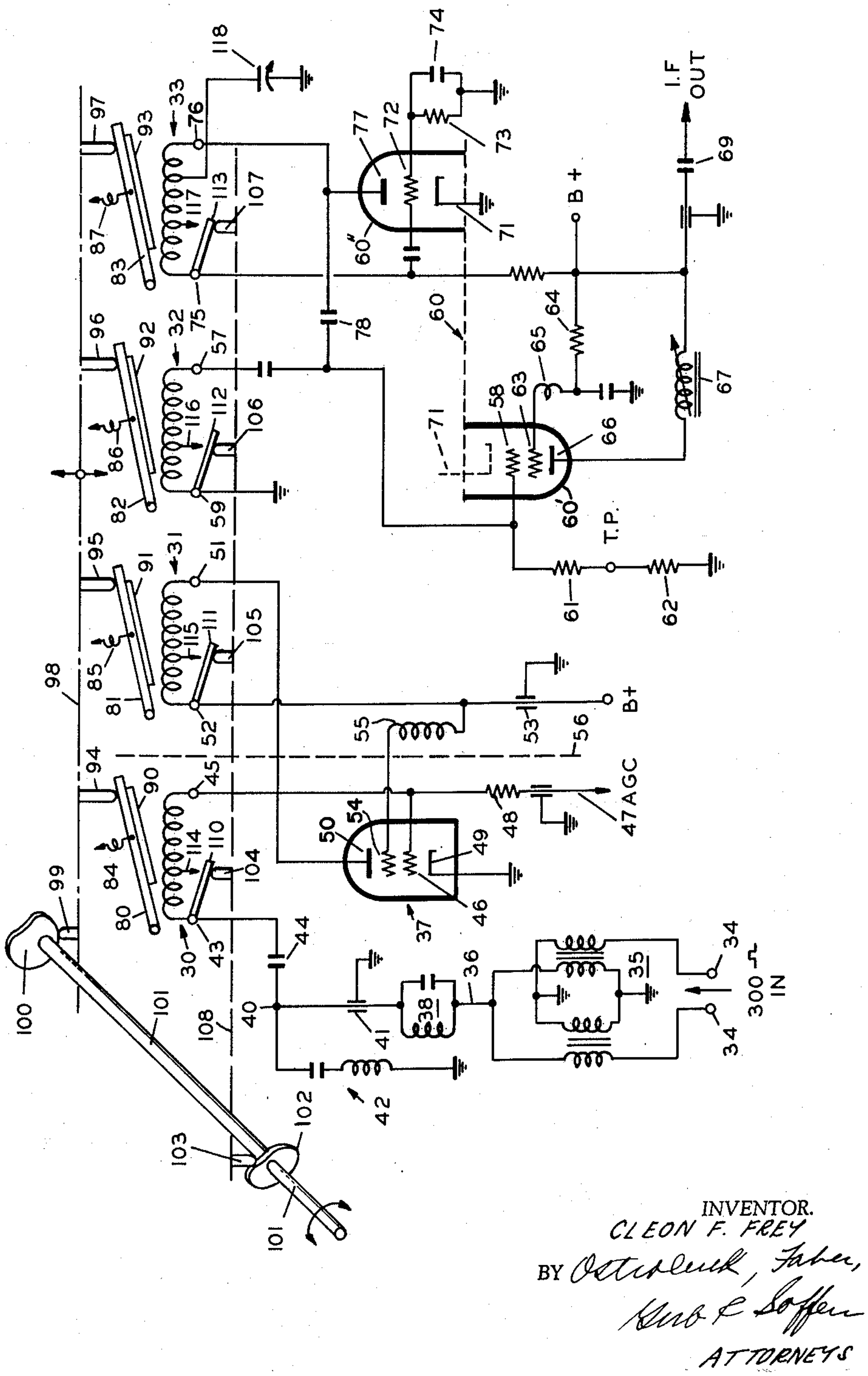
Fig. 1 is a schematic circuit diagram of the novel tuner, diagrammatically illustrating one form for the tuning.

Referring to Fig. 1, there is schematically illustrated a tuner circuit diagram to which the principles and features of the present invention are applied. It is to be understood that other circuit arrangements for the television tuner, incorporating an initial RF amplifier stage, and oscillator and mixer stages, may be used. The exemplary tuner embodies four basic coils 30, 31, 32 and 33 that constitute the tunable inductances for the respective RF input, RF output, mixer and oscillator stages. Before describing in detail the arrangements and means for varying the inductance values of the respective coils 30–33, to establish television VHF channel selection, the electronic circuit of the tuner is briefly described.

The antenna is connected to the 300 ohm input terminals 34, 34 of balun transformer unit 35. The balun 35 transforms the balanced impedance input at 34, 34 to an unbalanced line signal at output lead 36, for connection to the single ended RF amplifier stage 37. The RF input circuit comprises a suitable signal trap 38 in series with input lead 37 to input terminal 40, through feed-through capacitor 41. A shunt trap 42 is connected between input terminal 40 and ground. Input terminal 40 is connected to the input lead 43 of RF coil 30, through coupling condenser 44.

The output terminal 45 of coil 30 is connected to grid electrode 46 of tetrode tube 37. The automatic gain control lead 47 is also connected to grid electrode 46 through decoupling resistor 48 such as 10,000 ohms. The cathode electrode 49 of tube 37 is grounded. The anode electrode 50 of tube 37 is connected to output RF coil 31 at its input terminal 51 thereof. The low end terminal 52 of coil 31 is connected to the B+ supply, led into the chassis through a suitable feed-through capacitor 53, such as 1,000 mmf.

The screen grid electrode 54 of tetrode 37 is connected to the B+ supply through peaking coil 55, preferably to tuned in conjunction with the interelectrode capacity to electrode 54, to a channel 13 frequency. A shield 56, indicated in dotted lines is between the RF stage 37 with input coil 30, and the output coil 31 with the remainder of the television circuit of this invention. The mixer input coil is mutually coupled with the RF output coil 31.

The high terminal 57 of coil 32 is connected to the grid electrode 58 of tetrode section 60′ of a composite triode-tetrode tube 60 such as type 6CG8. The opposite or low terminal 59 of coil 32 is connected to ground. The grid electrode 58 is connected to ground through grid leak resistors 61, 62, the interconnection point of which is extended through the chassis as test point TP. The screen grid 63 is connected to the B+ supply through coupling resistor 64 and choke 65, which may be a peaking coil tuned similarly to 55 of the RF stage.

The anode 66 of tetrode mixer stage 60′ is connected to an adjustable output coil 67 which is tuned to the predetermined intermediate frequency of the tuner for the receiver, such as 41 mc. The B+ supply is connected to anode 66 through coil 67 and lead 68. The output circuit at the intermediate frequency is connected to the IF output terminal through coupling condenser 69 and feed-through capacitor 70.

The tuner circuit is a superheterodyne, with an oscillator section comprising triode 60″ of composite tube 60. The triode 60″ is interconnected with the oscillator coil 33 to introduce a suitable frequency in mixer coil 32 and establish the heterodyning at mixer stage 60′ to effect the desired intermediate frequency output with the modulations of the corresponding tuned-in television channels. The common cathode 71 of tube 60 is grounded. The triode grid electrode 72 is connected to ground through a 10,000 ohm resistor 73 and a shunt 10 mmfd. condenser 74. The grid 72 is also connected to terminal 75 of the oscillator coil 33, the opposite terminal 76 of coil 33 being connected to plate electrode 77 of triode 60″. The oscillator injection to the mixer circuit is effected by a combination of mutual coupling between coils 32 and 33, to some small degree in the exemplary embodiment, and implemented by a small coupling condenser 78 of the order of 2 mmfd.

Each of the main tuning coils 30, 31, 32, 33 have their inductance values altered in unison, in the manner of the present invention. Towards this end means are provided, including pivoted members or flappers of composition material 80, 81, 82, 83, coacting respectively with the coils 30, 31, 32, 33. The flappers 80–83 are individually spring biased away from their associated coils also. Each of the members 80–83 contain a metallic disc 90, 91, 92, 93 arranged to physically coact with the associated coils 30–33, due to pivoting action of the flapper members 80 to 83. Towards this end each of the flappers 80–83 have springs 84, 85, 86, 87 that spring press them against corresponding cam portions indicated at 94, 95, 96, 97. The cam members 94 to 97 are interconnected by means diagrammatically indicated by dot-dash line 98 to cam portion 99 coacting with a 360° cam 100. Rotation of cam 100 effectively controls the angular orientation of the flappers 81, 82, 83 with respect to their associated coils 30, 31, 32, 33. Such angular control is predetermined and effected in unison by the cam mechanism 94 to 100.

Angular variation of the metallic discs 90 to 93 with respect to their associated coils 30 to 33 changes the inductance value of the coils in a predetermined manner, to correspondingly change the tuning of the television tuner circuit. The metallic discs 90, 91, 92, 93 are of thin copper sheet or foil in the exemplary embodiment. The action of the copper reduces the inductance value of a coil as it is placed in closer physical relationship with respect thereto. Thus, as cam 100 presses the cam portions 94–97, downwardly in Fig. 1, against the biasing action of the associated springs 84 to 87, the flapper members 80 to 83 are moved closer to the coils 30 to 33, and the associated copper discs 90 to 93 cause the inductance of the respective coils 30 to 33 to be correspondingly lowered.

As the capacitance sections of the remainder of the tuning circuits are unaltered, the lowered inductance values correspondingly increase the frequency to which the tuner is made responsive and effective. By calibrating the actual physical positions of flappers 80 to 83 with respect to coils 30 to 33, through the design of cam 100 in a manner to be set forth in more detail hereinafter, the tuner circuit is accurately tuned to predetermined television channels by the inductance adjusting means of the invention. The tuning cam 100 is controlled by the tuning shaft 101 to which it is directly connected. By coordinated design of the shape of cam 100 with respect to the angular position of shaft 101 for the respective channels, and in conjunction with a suitable detent means to be described, accurate efficient tuning of all the twelve VHF channels, and of the conversion of the tuner for UHF reception, is effected in a simple and a practical manner.

It is to be understood that while the exemplary embodiment utilizes copper sheet for metallic discs 90 to 93, that other equivalent metallic materials may be used to reduce the inductive values of the coils 30 to 33 as the metallic discs are moved closer thereto. On the other hand, paramagnetic material may instead be used, which having a magnetic permeability greater than unity causes an increase in the inductance value of the respective coils at it is moved closer to the coils. A suitable paramagnetic material is comminuted powdered iron formed with a suitable binder to effect low-loss operation at the high frequencies of the tuner circuit. The use of paramagnetic materials involves the reverse directional motivation to the exemplary embodiment with the copper sheet material that reduces inductance as it approaches a coil.

A further important aspect of the present invention is to utilize electrical switching to change the inductance of the coil for the tuner in conjunction with the metallic discs. Towards this end, a portion of each coil is short-circuited when the coil set is used to tune the higher of the two bands of the VHF range. The unshort-circuited or full coils 30, 31, 32, 33 represent a greater inductance than when short-circuited and accordingly are used when tuning in the lower band, namely for channels 2 to 6. With the coils 30 to 33 suitably short-circuited, sufficient reduction in their respective inductance values are effected to produce accurate tuning of the upper band, namely channels 7 to 13 in conjunction with the controlled spaced displacements of the metallic discs 90 to 93. Such coil switching arrangement is diagrammatically illustrated in Fig. 1.

In the two band operation of the circuit of Fig. 1 a cam 102 is secured with control shaft 101, in proper angular phase. Cam 102 actuates cam portion 103 which in turn is mechanically coupled to the diagrammatically indicated cam portions 104, 105, 106, 107, by the dashed line 108. Each of the coils 30, 31, 32, 33 has an associated switch lever 110, 111, 112, 113 pivoted and biased against their associated cam portions 104, 105, 106, 107 and connected to the respective terminals 43, 52, 59 and 75 of the coils. Each of the coils 30 to 33 has an intermediate contact 114, 115, 116, 117 appropriately located on the coil whereby closure of the respective switch levers 110 to 113 thereagainst will short-circuit sufficient inductance to result in the remaining coil portions in circuit with the television tuner to effect the tuning in the higher band, namely channels 7 to 13, through the action of the movable copper discs 90 to 93.

The short-circuiting of the coils 30 to 33 is effected through the action of cam 102, which in the proper detented angular positions corresponding to the tuning-in of channels 7 to 13 through manual control shaft 101, effects the closure of switch levers 110 to 113 on the corresponding contacts 114 to 117, as aforesaid. For the remaining channels, namely the lower band channels 2 to 6, cam 102 permits the cam portion 103 to be in its lower position indicated in Fig. 1. Thereby, the switch levers 110 to 113 are in their open position, with the full coils 30 to 33 being in circuit with the tuner.

Only two modes, namely for the high and low bands of the VHF range, have been illustrated in Fig. 1 for purposes of clarity. A third mode namely for UHF reception is also contemplated by the present invention, and is described and illustrated hereinafter in connection with Figs. 18, 19. A fine tuning condenser 118 is connected to an intermediate tap on oscillator coil 33 so as to give constant fine tuning range for each of the twelve television channels. The fine tuning condenser 118 is adjusted through a fine tuning shaft arranged coaxially on main control shaft 101 in a manner to be described in more detail in connection with Figs. 15 and 16.

Figures 2, 3, 4, 5, 6:
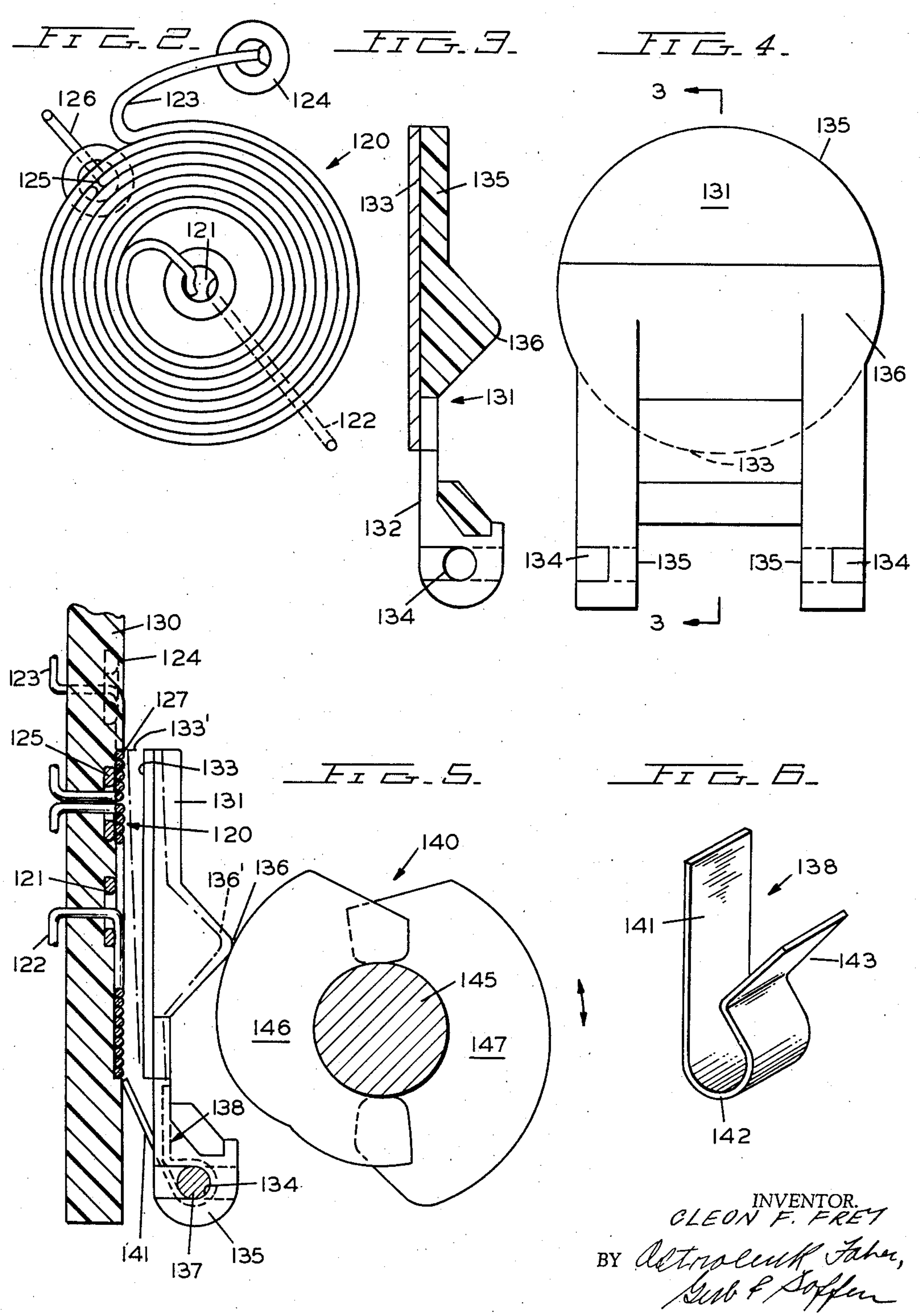
Fig. 2 is a plan view, enlarged, of a flat coil utilized in the exemplary tuners.
Fig. 3 is a longitudinal cross sectional view through the tuning flapper for the exemplary tuner, taken along the line 3—3 of Fig. 4.
Fig. 4 is a plan view of a tuning flapper utilized in the exemplary tuner.
Fig. 5 is a cross sectional view through a portion of the exemplary tuner, corresponding to the view taken along the line 5—5 of Fig. 8, illustrating the action of a tuning flapper with respect to a fixed pancake coil.
Fig. 6 is an enlarged view, in perspective, of a spring used with the tuning flapper of Fig. 5.

Fig. 2 is a plan view of a typical flat or pancake type coil used in the invention circuits. The coil indicated at 120 corresponds to coils 30 to 33 of Fig. 1. Coil 120 is wound closely spaced, such as ten turns in a spiral flat arrangement. While a single layer is indicated for coil 120 in Figs. 2 and 5 more than one layer may be used, and other coil configurations are also encompassed by the principles of the invention. The exemplary coil 120 is single cotton covered copper wire having its central terminal 121 in a form of a rivet holding the corresponding coil end to the coil board or panel 130 (see Fig. 5). Electrical connection 122 is made beneath the panel 130 to the central terminal 121 of coil 120. The end of outer turn of coil 120 extends as lead 123 to a rivet 124 on the coil board. Other types of terminal connections for coil 120 are usable. The intermediate point of coil 120 which is shorted to central point 121 is indicated in rivet 125 to which connection 126 is made beneath the coil board. The pancake coil 120 is mounted in a recess or suitable groove 127 in the coil board 130 as shown in Fig. 5.

Figs. 3 and 4 are enlarged views of an exemplary flapper 131 corresponding to composition flappers 80 to 83. Flapper 131 comprises a flat surface 132 to which a copper foil disc 133 is affixed. Pivotal mounting for flapper 131 is arranged through openings 134, 134 in projecting legs 135, 135 of flapper 131. The effective face 135 and the coacting foil layer 133 are circular, corresponding to the shape pancake coil 120 with which it coacts. A nose 136 projects from the back of flapper 131 for coaction with cam elements to be described in detail in connection with Figs. 5, and 8 to 10.

Fig. 5 illustrates the pivotal coaction of flapper 131 and its associated copper disc 133, with pancake coil 120 mounted in coil base 130. The flapper 131 is pivotally supported in a rod 137 that extends across coil board 130, for all of the flapper elements (see Fig. 7). A spring member 138, (see also Fig. 6), is arranged to mechanically bias the pivotal flapper 131, in the direction away from coil 120, and maintains the flapper nose 136 against cam assembly 140. The spring 138 of Figs. 5 and 6 has a flat portion 141 against the top of coil base 130. The arcuate portion 142 of spring 138 subtends the rod 137. The upper shorter portion 143 of spring 138 rests against the underneath central portion of the flapper 131 to bias it against cam assembly 140.

In a practical embodiment of the exemplary tuner the angular motion of flapper 131 was to a maximum of 15° for its upper position away from coil 120. Other angular swings for the flappers 131 are feasible. With a copper disc at metallic layer 133 the closer flapper 131 approaches coil 120 namely the less the angular deviation of flapper 131 from base 130, the less is the resultant inductance of the coil, as aforesaid. The closer position 131' of the flapper and its associated metallic disc 133' are indicated in dotted lines in Fig. 5. The cam assembly 140 is controlled by tuning shaft 145 for the exemplary tuner. The cam assembly 140 comprises two cam elements 146, 147 arranged to effect a 360° control displacement action on the associated flappers 131 through their nose 136 biased against cam 140.

The tuning shaft 145 is rotatable in either direction over a 360° sweep and through detent means to be described positions the associated flappers 131 at an accurate angular relationship with respect to the fixed coils 120 to effect the twelve channel tuning of the tuner. Further details of cam means 140 are described and illustrated in connection with Figs. 8 to 10.

Figure 7:
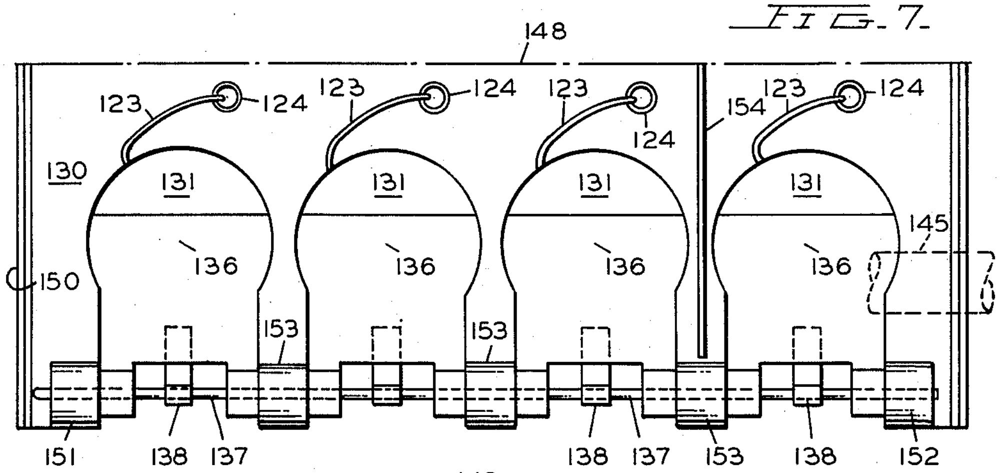
Fig. 7 is a side elevational view of the tuning flapper arrangement of the exemplary tuner, with the cam shaft omitted.

Fig. 7 shows the arrangement of a set of four flappers 131 for the tuning of the exemplary tuner unit. Only the portion of the tuner containing these flappers is illustrated below dot-dash line 148. The tuner chassis 150, 150 constitutes the supporting frame for the tuner. The coil board or base 130 is supported within chassis frame 150. The flappers 120 are supported on the common rod 137 mounted in end bearings 151, 152. Intermediate bushings 153 also support rod 137. The tuning or control shaft 145 is indicated in dotted lines in Fig. 7. A metallic shield 154 is arranged intermediate of the tuner assembly corresponding to the shield indicated at 56 in Fig. 1.

Fig. 8 adds components to the view of Fig. 7, the shaft 145 and accompanying cams 140 coacting with the individual flappers 131, as well as the detent mechanism at the left end. The tuning shaft 145 is mounted in frame 150, 150. A retainer 155 supports the right end of shaft 145, and an opening in chassis 155, for a conical projecting tip 156 of shaft 145 supports the left end thereof. The detent means comprises detent gear 157 coacting with a detent roller 158, biased by spring 159 as seen more clearly in the sectional view Fig. 11. The switch-over cam 160 is secured to control shaft 145, and detailed further in connection with Figs. 12 and 13.

Each flapper 131 has an associate set of cams 140 connected to the rotatable tuning shaft 145 for controlling the angular position of each flapper with respect to its associated coil 120 (see Fig. 5). Each cam means 140 comprises a cam pair 146, 147 as shown in Figs. 5, 9, 10, for accurately controlling the angular position and relation of its associated flapper 131 with a coil 120 mounted in coil board 130. While identical numerals have been assigned to the flappers 131 and sets 140, for the purposes of clarity of presentation, it is to be understood that when necessary the individual cams 146 and 147 of each cam set may be different should the camming action displacement relation of the associated flapper 131 be different for its coacting coil 120.

In other words, each of the four coils 30, 31, 32 and 33 while shown as coil 120 in Figs. 2 and 5 may be with different parameters depending upon the circuital requirements of the tuner. Basically, however, the coils 20 are arranged in a similar fashion such as the pancake arrangement of coil 120 associated with the individual flappers 131 and metal discs 133 for inductance variation through the common control shaft 145.

Thus it is to be understood that this invention lends itself to independent inductances for the individual coils 120 and distinctive interconnections thereof in a circuit as indicated in Fig. 1; as well as individual cam development for the cam means 140 associated with each of the flappers 131 and corresponding coils 120. The common shaft 145 and detent 157 effects the twelve or thirteen angular positions of action of the cam sets 140 with respect to their flappers 131. The flappers 131 are biased against cams 140 across the flapper nose portions 136. Where a tuner contains thirteen detented positions the "thirteenth position" corresponds to UHF amplification through the tuner, as will be set forth hereinafter in connection with Figs. 18, 19.

Figs. 9 and 10 illustrate shapes of exemplary low and high band cams 146 and 147 respectively of the cam sets 140 for the tuner. The positions on these cams marked for channels (2) to (13) correspond to distinct radial positions between the shaft 145 and the nose 136 of an associated flapper 131. The longer the said radial distance of the cams 146, 147 the closer the flapper 131 is pressed toward the coil board 130 and associated coil 120. In other words the greater the radial distance of an engaged surface portion of cams 146, 147 the closer the copper disc 133 is positioned with respect to the associated coil 120 (see Fig. 5), further reducing the inductance in correspondence with its closer position as aforesaid. The position (U) represents the UHF conversion position as the smallest radius for channel 2.

As will be described in connection with Figs. 18 and 19, the conversion position for UHF entails the insertion of an additional inductance in the exemplary tuner coils beyond that for channel 2 reception. Thus, the frequency for channel 2 reception starting at 54 megacycles, is reduced to the order of 40 or 41 megacycles for the desired IF conversion of the tuner. The tuner circuit is converted to an IF amplifier for the UHF signals that are priorly heterodyned down to such IF range. The two cams 146, 147 may of course, where desired be constructed as a single 360° cam. However, the use of two half-cams as illustrated in Figs. 9 and 10 for cams 146, 147 mounted at adjacent positions to constitute cam assembly 140 is a simpler expedient. As stated above it is clear that while in practice identical cam sets corresponding to 146, 147 are usable for at least three, if not all four of the basic coils of the tuner, different cam shapes may be used in each position in accordance with the requisite inductance changes for the particular channel positions of the tuning shaft 145 as will be now understood by those skilled in the art.

Fig. 11 illustrates an exemplary detent arrangement corresponding to the view taken along the line 11—11 of Fig. 8. The detent disc 157 contains thirteen fingers 161 subtending intermediate scallops or cavities 162, for detent roller coaction. The control shaft 145 is secured centrally of detent 157. A roller 163 rides along the detent and impedes the motion of the shaft 145 in a normal detented relationship, the roller 163 is rotatably supported in bracket 164 in turn pivoted at 165 on the frame of the tuner. The arcuate spring 166 has an arm 167 which presses roller 163 against detent gear 157. Spring 166 is riveted at 168 to the tuner frame.

The detent gear 157 has thirteen positions and accordingly sets the main shaft 145 at thirteen predetermined angular positions. These thirteen positions correspond to the twelve VHF television channels Nos. 2 to 13. plus a UHF tuner (IF) conversion position (U). At each of the thirteen positions mechanically predetermined for the rotational displacement of shaft 145, corresponding channel positions of cams 146 and 147 are presented against the nose 136 of each flapper 131, as indicated in Figs. 5 and 8. The said positions are marked on the cams 146, 147 in Figs. 9, and 10 respectively.

In a practical embodiment of a tuner constructed in accordance with the circuit and arrangement of Figs. 1 to 20, the following chart indicates the displacement of the centers of the respective flappers (131) from the fixed pancake coils (120).

| Channel: | Displacement |
|---|---|
| 13 | .015" |
| 12 | .020" |
| 11 | .032" |
| 10 | .049" |
| 9 | .070" |
| 8 | .110" |
| 7 | .175" |
| 6 | .020" |
| 5 | .030" |
| 4 | .060" |
| 3 | .100" |
| 2 | .150" |
| (U) | .150" |

As stated above the angular displacement of the flappers 131 with respect to the coils 120 is of the order of 15°. More or less than such swing for flappers 131 may be employed in practice. It is noted that the double swing of the respective cams 146, 147 constitutes a cam assembly 140 that effects the two bands for the VHF range. Also as will be described in more detail in connection with Figs. 17 to 19, a switch-over of the coils 120 occurs at the respective upper and lower bands simultaneous with the switchover of the cams 146 and 147 between the bands. Further, for the UHF conversion position (U), an additional coil is switched in with each of the basic pancake coils 120 to lower the inductance of the respective tuner circuits below channel 2 to the IF frequency range as shown and described in connection with Figs. 18 and 19 hereinafter.

While the above charted displacements are typical for a given application, it is to be understood that the separate coils and flapper combinations for a tuner may have individual cam designs as well as inductance designs where required. In production, it has been found that for a given design and construction for coils and flapper displacements the cam units 140 are reproduceable in mass production once the parameters and dimensions are empirically or otherwise determined.

Fig. 12 illustrates in perspective switch-over cam 160 based on a two-mode operation for VHF reception. Cam 160 is used for example with the circuit arrangement of Fig. 1 where no UHF (U) conversion position is used. This would be used in a two-mode twelve-position tuner where the cam 160 effects changeover between the channels. The cam 160 may correspond to twelve detented positions with two-band operation. Where desired a third mode for UHF switch-over is effected by a further increase in the distance of the displacement of the flappers 131 from the coils 120 to correspond to position a (U') position on the cam 146 shown dotted in Fig. 9. In such latter case, the inductance of the residual coils 120 is sufficient to provide the UHF conversion frequencies without the addition of external coils as illustrated in Figs. 18 and 19.

In any event, thirteen positions can be provided to produce tuning of the higher band namely channels 7 to 13, which covers seven of the thirteen detented steps. Switching over to the low band including the (U) position is a six step arrangement. The switch-over by cam 160 is accordingly over approximately 194° corresponding to the seven positions of the high frequency band over which the cam surface 170 is effective in the switching; with the bent over portions 171 demarking the remainder of the cam 160 which permits the two-position switch to be moved to the lower band encompassing channels 2 to 6 plus (U). Where the (U) position is not required in the tuner, only twelve positions of the switch cam 160 and detent 157 need be employed. In such event each detent position corresponds to 30 angular degrees of rotation of the shaft 145 and cam 160 for its seven upper band positions would encompass 210°.

Fig. 13 illustrates the action of the switch cam 160 on a switch element 172. The switch element 172 comprises a roller 173 which engages the surface 170 of cam 160 to press the switch arm 174 radially outward with respect to shaft 145. During the non-active position of cam 160, the roller 173 moves radially closer to shaft 145 in view of a spring biasing action (not shown) but understood. The two-way displacement of switch arm 174, corresponds to the displacement of cam component 103 and its accompanying cam elements 104 to 108 diagrammatically indicated in Fig. 1 for the actuation of the two-way switch arms 110 to 113.

As seen in Fig. 14, a retainer 155 supports shaft 145 in operating position through suitable opening. Retainer 155 extends along the frame 150. A machine screw 175 is used to fasten the right end of retainer 155 to frame 150 along slot 176.

Figs. 15 and 16 respectively are side elevational views of the tuner portion incorporating the fine tuning control. The fine tuning sleeve 177 is arranged concentrically about the main tuning shaft 145. A fine tuning cam is constituted of sleeve portion 178 secured with fine tuning shaft 177 and cam face plate 179 integral with and containing an interior face cam 180. The cam 180 is designed to radially displace cam follower 181 of spring metal pivoted at 182 being fastened at the outside end of an internal rod 183. Rod 183 extends across the interior of the tuner to a fine tuning condenser (not shown).

A spring arm 184 rests on the periphery of end plate 179 to establish a firm relationship between follower 181 and cam 180. The shape of cam 180 such as to angularly displace cam follower 181 in accordance with a predetermined pattern for controlling the angular displacement of the fine tuning condenser within the tuner that corresponds to condenser 118 in the circuit of Fig. 1. Rotational displacement of fine tuning sleeve 177 causes this fine tuning condenser (not shown) to be operated by rod 183 in a conventional manner to establish the fine tuning adjustment for each of the selected channels.

Fig. 17 diagrammatically illustrates the electrical switching of the individual tuning coils 120. The two-band switching illustrated in Fig. 17 corresponds to the two-step on-off short-circuiting of the coils 30 to 33 in Fig. 1. The conductive switch member 185 is motivated to the open position thereof indicated in solid lines whereby the full coil 120 is in circuit between the "high" lead 123 and the "low" lead 122, to the second output terminal 186. This full inductance corresponds to the lower tuning band channels 2 to 6.

With the switch member 185 moved to the left, to dotted position 185' a short-circuiting occurs betwen contact 187 connected to the lead 122 and contact 188 connected to lead 126. The effective shorting-out of coil 120 between points 121 and 125 effected thereby presents a substantially lowered inductance result between leads 123 and 186. This shorting-out is effective during the high frequency band reception including channels 7 to 13.

In Fig. 18 the circuit arrangements are shown including the UHF conversion position (U) in the tuning circuitry for the tuner. In this case, the same coil 120 is used with the addition of an external coil or inductance 190 between the output lead 186 and the central lead 122 of the inductance 120. The coil 190 is designed to serially add inductance between leads 123 and 186 to that of the inductance of coil 120, such that with the remaining parameters of the individual circuits of the tuner it is converted to the 40 or 41 megacycles IF amplification as desired. While a separate coil 190 is shown it is to be understood that in some cases it may be desirable to increase the initial inductance of the coil 120 and utilize an additional tap on the coil to include the added inductance corresponding to 190.

The metallic shorting element 191 effects the switching for the three modes of operation of the tuner in this embodiment. In the indicated solid position central of its operation element 191 short-circuits contacts 187 and 192. This shorts out the added inductance 190 between the circuit leads 123, 186 and corresponds to the reception of the low-band channels 2 to 6.

When switch-element 191 is in its position to the right at 191′ such short-circuiting is avoided as it is moved away from contact 187. This corresponds to the UHF conversion position (U) indicated in Fig. 18 with the coil 190 inductance added to the full inductance of coil 120. With the switch element 191 at the extreme left position 191″, all three contacts 187, 192, 193 are short-circuited thereby to effectively reduce the overall inductance between leads 123 and 186 to its minimum. The latter position represents the reception inductance position for channels 7 to 13 the upper-band of the VHF range.

Fig. 19 is a diagrammatic representation of a three-mode switching actuation arrangement for the tuner in accordance with the present invention. Only one of the four coils 120 are illustrated in Fig. 19 for the sake of clarity, it being understood that the other coils of the circuit corresponding for example to coils 30 to 33 of Fig. 1, are similarly employed. It is also to be noted that in the UHF conversion position (U) the coil circuit representing the oscillator is cut out of circuit or the oscillator circuit is otherwise disabled during the (U) reception in order to permit the tuner to operate as an IF amplifier without heterodyning action.

The switching of the coils for the three modes of operation is activated by a suitable cam such as 195 having a camming structure 196, in the form of a groove in the illustrated version. A cam follower 197 operates within cam groove 196, and is connected to a link 198 pivoted at 199. Link 198 is oscillated from its illustrated central position to the right or left in accordance with the track position of cam groove 196 with respect to follower pin 197.

The central position indicated (2–6) corresponds to the low band mode of operation for reception of channels 2 to 6. This positions slot 200 of link 198 which engages pin 201 to establish the central position of strip 202 of insulation material. Strip 202 operates in guides 203, 204 laterally. In the central mode of operation for the low frequency band, the respective contacts 187, 192 of the four coils 120 are short-circuited by corresponding switch elements 205. This corresponds to the circuit indicated in Fig. 18 for the reception of channels 2 to 6. The cam groove 196 extends along the central (2–6) position for cam 195 for five detented positions of control shaft 145.

In the succeeding control shaft position the groove 196 extends to the right edge of cam 195 indicated at (7–13) with the cam follower 197 engaging the high frequency groove (7–13). Pin 197 is operated thereby to the right moving pin 201 and strip 202 to the left. In such position, the metallic switch elements 205, 205 short-circuit each of the corresponding lead contacts 187, 192, 193 to correspond to the (7–13) position 191″ of Fig. 18. In this position (7–13) the coils 120 present their minimum inductance and the exterior coil 190 is also short-circuited.

Correspondingly, when cam 195 is in its UHF conversion position wherein groove 196 is engaged with follower pin 197 at its (U) section, link 198 displaces strip 202 to its extreme right position. This position corresponds to (U) at 191′ of Fig. 18 wherein the maximum inductance of coil 120 together with that of coil 190 is presented to the tuner circuitry. The tuner is thereby converted to an IF amplifier for the UHF reception as will now be understood by those skilled in the art. Other expedients for effecting the switching and conversion of the plurality of coils and inductance values may be utilized. Basically the several modes of operation of the inductance changes through cam 195 and the operation of control shaft 145 are performed in conjunction with the inductance variation of the basic coils 120 by the flappers 131 and associated metallic plates 133 as aforesaid to effect the intermediate tuning positions for the high and low frequency band modes.

The exemplary television tuner is shown in its completely assembled form in Fig. 20 in side elevational view with the side shield cover removed. Fig. 20 corresponds to the assemblage of the components of Figs. 8 through 16 together with circuit connections not seen in the drawing but inclusive of Fig. 1. Antenna input terminals are mounted on board 207 extending from top portion of chassis plate 150. The balun 208 is mounted on board 207 and connected to terminals 206. Lead 209 of balun 208 is grounded at rivet 210 on chassis 150. Output lead 211 is connected to terminal 212 which connects to circuitry beneath the top chassis panel 215. Terminal 212 extends through feed-through capacitor 213 to connection 214 at chassis 215.

The condensers, traps, resistors and other components of the tuner circuit are mounted along the chassis 215 in a conventional manner. The RF amplifier tube 216, corresponds to the tetrode 37 of Fig. 1, such as type 6BC5. Tube 216 is mounted in socket 217 and is surrounded by a tube shield comprising fixed portion 218 secured to chassis 215, and a telescopic portion 219 therewith. Other feed-through condensers 220, 221 adjustable condensers 222, 223, 224 and adjustable inductor 225 are mounted on the chassis and extended therebelow. Test point 226 corresponding to TP of Fig. 1, extends above chassis 215. Other resistors, condensers and electrical components corresponding to the circuit of Fig. 1, interconnect the tubes 216 and 227 and the coils 120 (not shown) of the tuner of Fig. 20.

The tube 227 corresponds to the dual-purpose triode-tetrode stage 60 of Fig. 1. Tube 227 is mounted in tube socket 228 and is surrounded by a fixed shield portion 229 with a section 230 telescoping therein. Tuning is effected by the rotation of control shaft 145 in thirteen detented positions corresponding to the teeth of detent gear 157. The flappers 131 are variably positioned with respect to the fixed pancake coils (120) on coil panel 130 (see Fig. 5). The cam sets 140 control the adjustable positions of the flappers 131 for effecting the predetermined inductance changes of coil 120 as described hereinabove. The coil switching operations corresponding to Figs. 17 to 19 is effected by a cam such as 160 or a three-mode cam as 195 of Fig. 19.

The principles and features of the exemplary tuner illustrated in Figs. 1 to 20 may take other forms, without departing from the broader scope of the invention. The invention may assume other physical forms as will now be described.

Figs. 21, 22 and 23 are respectively, perspective, elevational and top views of a modified tuner version within the principles of the present invention. It is noted that tuner 300 is arranged in a cylindrical shape subtending the circular coil disc 305 and the coacting circular tuning metallic plate disc 310. The cylindrical tuner form for tuner 300 including its arrangement of the vacuum tubes, resistors, condensers and other components is similar to that described and illustrated in copending application Serial No. 627,793, filed December 12, 1956, entitled "Compact VHF Television Tuners," and assigned to the same assignee as the present case. The tuner 300 is illustrated without many electrical circuit components as resistors, condensers, inductance coils, and wiring in order to more clearly set forth the mechanical aspects and their novel interrelationships. Electrical circuitry as used in tuner 300 may be that illustrated in Fig. 1, or as otherwise desired.

Basically, the chassis of the tuner 300 is formed with two parallel stepped sides 311, 312 separated by horizontal platform section 313. The separation between chassis 311 and 312 across horizontal platform 313 provides space to suitably mount the two vacuum tubes 314 and 315 in their respective sockets 316 together with the electrical components associated therewith, including fine tuning arrangement 320 to be described in more detail. The stepped chassis 311, 312, 313 may be formed of a unitary metal sheet, preferably of relatively heavy gauge, as it is utilized for supporting all the chassis components including the tubes 314, 315 the circuits, the tuning shafts 321, 322 and cylindrical shield 323 seen (dotted in Fig. 22).

The peripheral contour of the parallel chassis sides 311 and 312 is in the form of a circle when viewed perpendicular to their respective planes, and suitably fit with cylindrical shield 323. Shield 323 has a portion 323′ projecting to the lower forward chassis face 312 (see Fig. 22). While a cylindrical form for shield 323 and the chassis 311, 312 arrangement has been illustrated, it is to be understood that other shapes are equally feasible. Such cylindrical pattern conserves weight, size and material costs.

A shaft support plate 324 is suitably secured to front chassis panel 312 as by staked lugs 325, 325. Channel selector shaft 321 is concentrically housed within the fine tuning shaft 322 which in turn is rotatably mounted in opening 326 in plate 324. A spring wire 327 is bowed between lugs 328, 328 of plate 324 and pressed against fine tuning shaft 322 centrally of spring 327. A spring washer 330 coacts with an annular groove 329 in shaft 322 adjacent the plane of plate 324. The combination of spring wire 327 and spring washer 330 holds shaft assembly 322 with shaft 321 therein, in a smooth rotatable relationship in plate 324.

Shaft 321 is rotatably supported between vertical rear chassis panel 311 and support bracket 324. The fine tuning shaft 322 rotates about control shaft 321 and is anchored against axial displacement by the springs 327 and 330 described. Fine tuning shaft 322 has a laterally cammed surface 336 which coacts with a projecting lip 337 of a spring mounted condenser plate 338 of condenser assembly 320, see Fig. 22. The end portion of metallic condenser plate 338 is secured to the adjacent chassis (not shown).

Condenser plate 338 is resilient of spring-type material, with its projecting lug 337 biased against the cammed surface 336 at the interior end of fine tuning rod 322. Fixed fine tuning condenser plate 340 coacts with displaceable condenser plate 338, and is connected directly to the oscillator circuit as described in connection with Fig. 1. At this juncture it is pointed out that rotation of fine tuning shaft 322 executes a corresponding displacement of fine tuning condenser plate 338 with respect to fixed condenser plate 340 to effect the fine tuning for the tuner. The fine tuning system 320 is thus physically close to the oscillator circuit.

The antenna input terminals 345, 345 for the tuner 300 extend from a dielectric plate 346 staked to rear vertical chassis panel 311 by projecting lugs 347, 347 thereof. The antenna terminals 345, 345 are connected to a balun, or unbalanced antenna transformer 348 of the tuner circuit. The vacuum tubes 314 and 315 are suitably shielded by corresponding shields 314′ and 315′ to minimize radiation. The chassis structure 311, 312, 313 serves to shield the circuit components of the tuner from radiation in conjunction with snap-on cylindrical shield 323.

The fixed electrical components on the tuner chassis and in circuit with vacuum tubes 314, 315 are similar to the fixed electrical components in the tuner of Figs. 1 to 20. The fixed circuit components, as aforesaid, are omitted from Figs. 21, 22, 23 of the tuner construction, for reasons of clarity of presentation. A detent gear 360 is secured firmly with control shaft 321 for accurately indexing the disc 310 angular positions. The disc 310 positions are such that angular rotation of shaft 321 will effect accurate axial or longitudinal displacement of tuning disc 310 with respect to the coils fixed with disc 305 as will be described in more detail.

An effective and simple detent is arranged with gear 360. A conical member 361 is pivotally anchored in bearing 362 at the end of a projection or bracket 363 extending from chassis panel 311. Conical member 361 extends through chassis panel 311 and coacts with detent gear 360, with its cylindrical head 364 riding between the gear teeth for the detenting action. A linear spring 365 is anchored between rivets 366, 367 in panel 311 with its central portion 368 coacting with conical body 361, pressing the associated detent head 364 against detent gear 360. Spring 365 presses detent member 361, 364 pivoted at 362 against toothed detent gear 360 to effect the predetermined angular dispositions of disc 310 with respect to fixed coil disc 305.

The circular coil board or disc 305 is fixedly mounted with chassis back panel 311 through spacer bushings 301 and flat headed mounting bolts 302 extending through bushings 301. Bolts 302 are locked by nuts 303 against chassis 311. The flat heads 304 of bolts 302 are countersunk into panel 305 as seen in Fig. 24. In the exemplary embodiment four of said bolts 302 and bushings are employed to fixedly mount the coil panel 305 with the tuner chassis 311. In accordance with the invention the tuning member disc 310 is axially displaced through the rotation of tuning shaft 321. Rotational displacements of shaft 321 in the predetermined angular positions defined by the detent gear 360 results in corresponding linear displacements along the axial direction of the tuner.

The circular tuning disc 310 is constrained against angular movement by pins 306. Pins 306 project through holes 307 in tuning disc 310 and are secured by a press fit with disc 305. The exemplary tuner 300 has four of such restraining pins 306 as seen in Figs. 22, 23 and 24. Pins 306 extend through the openings 307 of movable disc 310 as seen in Fig. 25. Since pins 306 are fixed with respect to the tuner 300 in view of its securement with the fixed coil board 305 axial movement of the tuning disc 310 is permitted by the pins due to the loose fit of holes 307 thereof over the pins 306 while rotational displacement of the disc 310 is prevented thereby. It is unnecessary to have a close fit of openings 307 with respect to pins 306 since small angular displacements of tuning disc 310 will not affect its tuning results. However, close fitting at 307 is desirable.

The movable disc 310 is of composition material upon which are mounted four circular metallic discs 350 in separated positions preferably equiangularly spaced as shown in Fig. 25. The metallic discs 350 coact with the stationary tuning coils 355 recessed within the composition coil board 305, as indicated in dotted lines in Figs. 22, 23 and seen in Fig. 24. The four basic tunable coils 355 are connected to the tuner circuit as in Fig. 1 and have intermediate connections as will be set forth in more detail for short circuiting during the reception of the higher frequency VHF band, namely channels 7 to 13 in the manner of Fig. 1. Spring contacts 356, 356 extend radially inwardly from coil disc 305 for short circuiting action by the shorting disc 370 (see Figs. 27, 28).

Tuning disc 310 is slidably mounted on the inner end of tuning shaft 321. A central hub 309 extends from disc 310 to afford a substantial coacting surface of disc 310 with shaft 321. Also, a helical spring 351 mechanically biases tuning disc 310 normally towards the fixed coils 355 in coil disc 305. An end washer 352 rests against a pin 353 set in shaft 321 and holds spring 351 from displacement to the left (Figs. 22, 28), causing the disc 310 to be biased to the right against coil disc 305. Fig. 22 shows the tuning disc 310 in its extreme left position furthest away from coils 355. Fig. 28 shows the disc 310 in its furthest position to the right, and closest to coils 355.

Fig. 22 is partially diagrammatic to more clearly depict the camming action for axial displacement of the tuning disc 310 and of the shorting disc 370. A pin 371 secured in shaft 321 actuates the camming surface 372 of shorting disc 370. A flat bowed spring 373 is secured by rivets 374, 374 to shorting disc 370. Spring 373 is bowed against the axially stationary detent gear 360. Thus, the shorting disc 370 is normally biased to the left in Figs. 22, 28 against the shorting contacts 356 of coil disc 305.

Rotation of control shaft 321 angularly motivates pin 371 to control its engagement with the surface cam 372 of the disc 370. As described in more detail in connection with Figs. 27 and 28, the shorting cam 370 is moved into and out of engagement with the shorting lugs 356 of the coil disc 305. Fig. 22 shows the shorting disc 370 engaged with the lugs 356 to effect the short circuiting of a portion of the coils 355 (in the manner of Fig. 1), for reception of the upper VHF band channels 7 to 13. Fig. 28 shows the pin 371 actuating disc 370 to its unconnected position for the lower VHF band channels 2 to 5.

The axially displaceable tuning disc 310 has a face cam 375 which coacts with a pin 376 fixed on shaft 321. Angular motivation of shaft 321 carries pin 376 about the face cam 375 to axially displace the disc 310 against the spring biased by spring 351. Diagrammatic Fig. 22 illustrates pin 376 with disc 310 in its extreme left or remote position from coils 355. Fig. 28 shows the disc 310 in its extreme right position, with its metallic discs 350 juxtaposed with coils 355. The axial camming action of face cam 375 is operative over twelve or thirteen positions of the tuner as desired namely for the twelve channels of VHF reception and where required for the (U) position for UHF reception. The angular position design of the face cam 375 is coordinated with the detent 360, and the desired channel reception positions on the dial (not shown) through control shaft 321.

Fig. 24 is a plan view of the coil disc 305 as seen along the line 24—24 of Fig. 22. Fig. 26 is the plan view of the rear of coil board 305 illustrating the interconnections of the respective coils 355 thereof, and the shorting lug 356 interconnections therewith. The individual coils 355 are of the pancake type as are coils 120 of the previous embodiment. They are preferably recessed in the coil board 305 and suitably adhered therewith in a stable mounting. The board recess is such as to permit the outer face of each of the coils 355 to be substantially flush with the outer surface of the composition low-loss material disc 305 for practical juxtaposition with the movable metal disc 350 of tuning disc 310.

The central end of each coil 355 is soldered to a central rivet 351 secured in disc 305. The outer end of each coil 355 is soldered to an additional rivet 352 adjacent to the coils and secured in coil board 305. Intermediate tap is established in each of the coils 355 as described in connection with Figs. 2 and 5 for coils 120. Such tap is effected by mounting rivets 353 in board 305 and soldering the suitable portion of each coil 355 therewith for the shorting purposes. Connection of the "high" end of each of the coils 355 is effected from the rear of the coil board through rivets 352 by leads indicated at 354. The interconnection of the coils is in accordance with the predetermined circuit for the tuner as for example that of Fig. 1, but of course may be otherwise as desired.

As the position of the coils 355 are fixed with respect to the body of the tuner 300 their interconnection to the circuit elements of the tuner (not shown) is direct and without necessitating sliding contacts etc., in a manner which will now be understood by those skilled in the art. As seen Fig. 26 the central rivet connection 351 of each coil 355 is connected directly to the terminal 357 of a corresponding lug 356. Similarly the intermediate rivet 353 is connected directly to its associated lug 358 of a shorting lug 356. Leads 359, 359 connect the posts 357, 358 to the fixed tuner circuitry (see also Fig. 28).

As noted in Figs. 24 and 26 in dotted, the shorting segments 380 of shorting disc 370 uniquely short-circuit the respective pairs of lugs 356 of each of the coils 355 when the shorting disc 370 is motivated (to the left as seen in Fig. 22) against the radially extending lugs 356. When the shorting disc 370 is in its unengaged position (to the right as seen in Fig. 28), the coils 355 are unshort-circuited, and present their full impedance to the tuner circuitry for the lower VHF band mode of operation.

Fig. 25 is a plan view of the tuning disc 310 containing the four spaced metallic circular plates 350. The diameter of each plate 350 and its position are designed to subtend a pancake coil 355. In the exemplary embodiment plates 355 are made of copper foil to effect the inductance changes described with minimum RF losses through axial displacement with respect to the coils 355. Plates 355 may be recessed within shallow grooves in tuning disc 310, or adhered to the surface thereof, for this purpose. Angular orientation of shaft 321 causes corresponding setting changes of foil 355 with respect to its associated coil 355 on coil board 305.

Fig. 27 is a perspective illustration of the shorting disc 370, as viewed in the direction of the face cam 372 thereof. The face cam 372 coacts with pin 371 affixed to shaft 321, as seen in Figs. 22 and 28. Cam 372 is a two-position cam corresponding to engagement and disengagement positions of the shorting metallic segments 380 recessed along the periphery of disc 370. The design of face cam 372 is derived from the angular positions of shaft 321 as determined by the detent 360, to produce the channel positions for the low VHF band mode, namely channels 2 to 6, and the high VHF band mode namely channels 7 to 13, as set forth hereinabove in connection with two-mode switch cam 160 of Fig. 12. The two rise portions 381, 382 of face cam 372 correspond to the junctions between the high band face 383 and the raised low-band face 384 as will be now understood by those skilled in the art. In the twelve-position version of shorting disc 370 the upper band face 383 subtends effectively about 194° while the remainder, lower-band face 384 subtends effectively about 166° for its five channel operation.

Fig. 28 is an enlarged cross-sectional view through the axially displaceable members 310 and 370 which establish the tuning conditions for the tuner 300. Fig. 28 is partially diagrammatic in connection with the face cams 372 and 375 for clarity of illustration. As set forth and now understood, disc 310 as well as shorting disc are low-loss composition material. The shorting segments 380 on the shorting disc 370 are arranged to connect with the radially depending lugs 356 extending from the fixed coil disc 305 when the pin 371 on shaft 321 abuts the high portion 384 of face cam 372 (see also Fig. 27). The shorting disc 370 when in its right side position is pressed against the biasing spring 373 as seen in Fig. 28. In this illustrated mode, the shorting segments 380 are separated from the connection lugs 356 to execute the low band mode for the coils 355.

When the recessed portion 383 of face cam 372 coacts with pin 371, as seen in Fig. 22, the shorting disc 370 is pressed to the left whereby its shorting segments 380 engage lugs 356 to short-circuit portions of coils 355 to produce tuning conditions for the higher frequency band mode of operation. Correspondingly with the tuning disc 310 in the position illustrated in Fig. 28, the copper discs 350 are close or adjacent to the fixed pancake coils 355 for the minimum tuning inductance modes thereof. This corresponds for example to channel 6 in the low-band mode of operation when the shorting disc 370 is in the non-shorting position as seen in Fig. 28. Correspondingly, when the same close or contiguous relation of metallic discs 350 is used in conjunction with the shorting condition of disc 370 in Fig. 22, it corresponds to the channel 13 tuning position.

The intermediate tuning positions of each mode are derived from the shape of face cam 375 and coacts with pin 376 on shaft 321 to controllably displace axially the tuning disc 310 against the biasing spring 351. The detent 360 establishes the angular position of pin 376 for the various channels to be tuned-in, with the face cam 375 proportioned to coact with pin 376 to create a displacement of the metal discs 350 with respect to the fixed coils 355 to effectively produce the inductance values in the coils 355 to establish the optimum tuning conditions of the circuitry for the respective channel positions. The lowest recessed point 385 of the face cam 375 of disc 310 is seen in Fig. 28 cooperating with pin 376 to establish the minimum displacement condition of the metal discs 350 with respect to coils 355.

While the coils 355 are described to be in one plane, as are discs 350 it is feasible to construct corresponding discs 305 and 310 with non-planar or stepped settings for the coils 355 and discs 350 in order to correlate required tuning ranges for each coil-disc and effect precise tuning of the circuitry for tuner 300 through a single tuning control shaft 321. Once such non-planar relations are established for a given tuner design and construction, its mass production is feasible. Other trimming elements may be incorporated for final adjustments of the coils and of axial location of disc 310.

It is to be understood that in a thirteen position tuner where the additional mode for UHF reception is desired the detent 360 is arranged with thirteen positions. Correspondingly the face cams 372 and 375 are designed to incorporate the (U) or thirteenth position. The low-band face cam 372 of shorting disc 370 would thereupon encompass an additional position with the shorting lugs 356 remaining unconnected for the (U) position. The face cam 372 would incorporate an additional cam level for coaction with three instead of two depending lugs in a manner set forth in connection with the thirteen position arrangement of Figs. 18 and 19. Similarly the face cam 375 of movable tuning disc 310 would incorporate the movements of the metal discs 350 within the same principle for establishing the UHF mode of the tuner circuitry converting its circuit to tune as an amplifier at the IF frequency for the heterodyned UHF signal.

The principles and features of the present invention may take other forms and arrangement as will now be evident to those skilled in the art. For example, in place of the flat pancake coils tubular coils may be used with cylindrical metallic bodies coacting through the axis thereof to establish the tuning positions by suitable cam motivation in unison with the main tuning shaft. Similarly, such tubular coils may be arranged on a plate in positions corresponding to coils 355 as on a circular disc 305. Also, the tubular coils may be arranged along a common tubular form and spaced therealong for coaction with metallic slugs operable through the form for individual coaction with the spaced coils.

The inter-mode switching of the inductances of the coils may be along the lines hereinabove described, but of course may be varied for specific requirements. The tuning metallic bodies which are cammed in unison may be pivoted as in the embodiment of Figs. 1 to 20; axially displaceable as in the embodiment of Figs. 21 to 28;

or otherwise adjusted to provide a unitary tuning operation on fixed coils for the respective modes of operation and channel selection for the VHF tuner. The significant reduction in connection contacts coils and number of mechanical components of the invention tuner renders its size, weight and cost of significant advantage over prior tuners.

As specific embodiments have been illustrated and described, it is to be understood that they are subject to variation and modification within the full intended scope of the invention as defined in the accompanying claims.

I claim:

1. A tuner for the reception of VHF broadcast signals having lower band and higher band frequencies comprising a plurality of multiple turn coils of pancake shape in circuit within the tuner, circuit means for short-circuiting a section of each of said coils to change the tuning mode of the tuner from the lower band to the higher band, means for controllably varying the inductance of each of said coils to effect the tuning-in of the VHF broadcast signals in each of the bands, said varying means including a metallic plate mounted adjacent each of said coils and mechanism for displacing said coils and plates in unison towards and away relative to each other to provide the tuning for the tuner in each of the frequency bands, and a common control shaft for operating said mechanism and said circuit means to establish progressive tuning-in of said VHF broadcast signals throughout said bands, said mechanism including a non-metallic member with a flat surface securing each of said plates for coaction with its associated coil, and cam means secured to said control shaft coactable with said non-metallic member.

2. A tuner for the reception of VHF broadcast signals having lower band and higher band frequencies comprising a plurality of multiple turn coils of pancake shape in circuit within the tuner, circuit means for short-circuiting a section of each of said coils to change the tuning mode of the tuner from the lower band to the higher band, means for controllably varying the inductance of each of said coils to effect the tuning-in of the VHF broadcast signals in each of the bands, said varying means including a metallic plate mounted adjacent each of said coils and mechanism for displacing said coils and plates in unison towards and away relative to each other to provide the tuning for the tuner in each of the frequency bands, and a common control shaft for operating said mechanism and said circuit means to establish progressive tuning-in of said VHF broadcast signals throughout said bands, said metallic plates being of thin copper material, and said mechanism including an individual non-metallic member with a flat surface securing each of said plates for coaction with its associated coil, each of said member being pivotally mounted, and cams secured to said control shaft coactable with each of said pivotal members.

3. A tuner as claimed in claim 2, further including detent means operative on said control shaft for determining the successive tuning positions for the tuner.

4. A tuner as claimed in claim 2, in which said circuit means includes circuit elements individually connectable with said coils to establish tuning by said coils at the tuner intermediate frequency for amplification of suitably heterodyned UHF signals by the tuner, and cam means operable by said control shaft for effecting the connection of said circuit elements with said coils at a predetermined angular position of said control shaft.

5. A frequency selector as claimed in claim 1, in which said coils and said plates are each respectively mounted in a common plane angularly spaced apart yet parallel to said control shaft.

(References on following page)

References Cited in the file of this patent

UNITED STATES PATENTS

| | | |
|---|---|---|
| 978,605 | Marriott | Dec. 13, 1910 |
| 1,571,405 | Goldsmith | Feb. 2, 1926 |
| 1,647,474 | Seymour | Nov. 1, 1927 |
| 2,341,345 | Van Billiard | Feb. 8, 1944 |
| 2,513,392 | Aust | July 4, 1950 |
| 2,513,393 | Frey et al. | July 4, 1950 |
| 2,549,789 | Ferrill | Apr. 24, 1951 |
| 2,587,419 | Washburn | Feb. 26, 1952 |
| 2,644,141 | Lytle | June 30, 1953 |
| 2,665,377 | Krepps | Jan. 5, 1954 |
| 2,867,765 | Klettke | Jan. 6, 1959 |

OTHER REFERENCES

Article, "New Rainbow Tuner," pages 48–50, "Radio-Electronics," January 1956.